United States Patent
Kim et al.

(10) Patent No.: US 8,605,692 B2
(45) Date of Patent: Dec. 10, 2013

(54) METHOD FOR SETTING TRANSMISSION OPPORTUNITY AND FOR TRANSMITTING AND RECEIVING DATA IN WIRELESS LAN SYSTEM USING MULTIPLE CHANNEL

(75) Inventors: Yun-Joo Kim, Daejeon (KR); Jeeyon Choi, Daejeon (KR); Sok-Kyu Lee, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 642 days.

(21) Appl. No.: 12/688,064

(22) Filed: Jan. 15, 2010

(65) Prior Publication Data

US 2010/0177757 A1  Jul. 15, 2010

(30) Foreign Application Priority Data

Jan. 15, 2009  (KR) .................. 10-2009-0003521
Jan. 15, 2009  (KR) .................. 10-2009-0003525
Jan. 15, 2009  (KR) .................. 10-2009-0003527

(51) Int. Cl.
*H04W 74/06* (2009.01)
*H04L 12/413* (2006.01)

(52) U.S. Cl.
USPC ........... 370/338; 370/447; 370/445; 370/461; 370/462; 455/450

(58) Field of Classification Search
USPC ......... 370/328–329, 338, 252, 461, 462, 445, 370/447–450
See application file for complete search history.

(56) References Cited

U.S. PATENT DOCUMENTS

| | | | | |
|---|---|---|---|---|
| 6,393,032 B1* | 5/2002 | Ikegami | ................ | 370/447 |
| 7,408,909 B2* | 8/2008 | Trainin et al. | ................ | 370/338 |
| 7,646,758 B2* | 1/2010 | Benveniste | ................ | 370/348 |
| 8,014,818 B2* | 9/2011 | Grandhi et al. | ............ | 455/552.1 |
| 8,023,480 B2* | 9/2011 | Kwon | ................ | 370/338 |
| 8,144,676 B2* | 3/2012 | Wentink | ................ | 370/338 |
| 2005/0147023 A1 | 7/2005 | Stephens et al. | | |
| 2005/0226270 A1* | 10/2005 | Liu et al. | ................ | 370/469 |
| 2006/0271969 A1* | 11/2006 | Takizawa et al. | ............... | 725/81 |
| 2007/0291913 A1* | 12/2007 | Trainin | ................ | 379/93.08 |
| 2008/0013496 A1* | 1/2008 | Dalmases et al. | ............ | 370/336 |
| 2008/0080553 A1* | 4/2008 | Hasty et al. | ................ | 370/468 |
| 2008/0112351 A1* | 5/2008 | Surineni et al. | ................ | 370/312 |
| 2009/0138603 A1* | 5/2009 | Surineni et al. | ................ | 709/227 |
| 2011/0044273 A1* | 2/2011 | Maltsev et al. | ............... | 370/329 |
| 2011/0096711 A1* | 4/2011 | Liu et al. | ................ | 370/312 |

* cited by examiner

*Primary Examiner* — Kwang B Yao
*Assistant Examiner* — Candal Elpenord
(74) *Attorney, Agent, or Firm* — Ladas & Parry LLP

(57) ABSTRACT

A transmission opportunity setting method in a wireless LAN system using multiple channels includes: receiving a request-to-send (RTS) frame from a wireless station, the RTS frame including information on a wireless LAN mode of the wireless station; and transmitting a clear-to-send (CTS) frame to the wireless station according to at least one of the number of remaining available channels among the multiple channels and the wireless LAN mode of the wireless station.

14 Claims, 13 Drawing Sheets

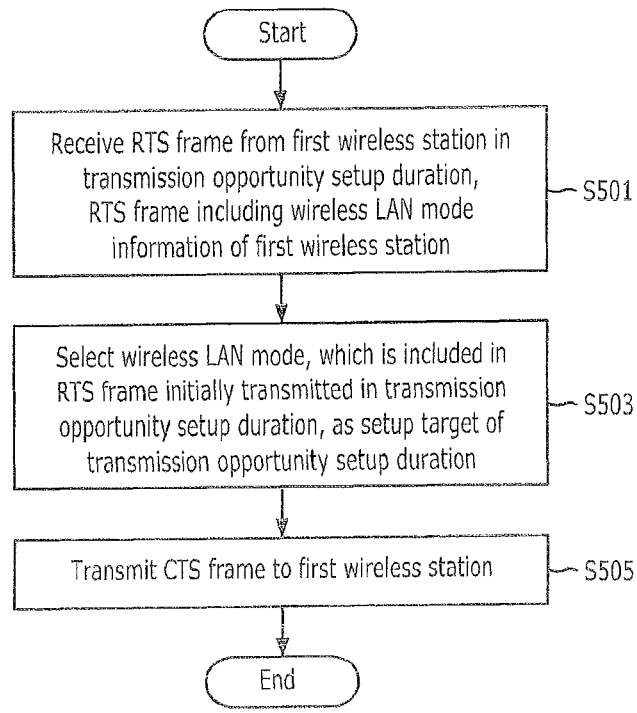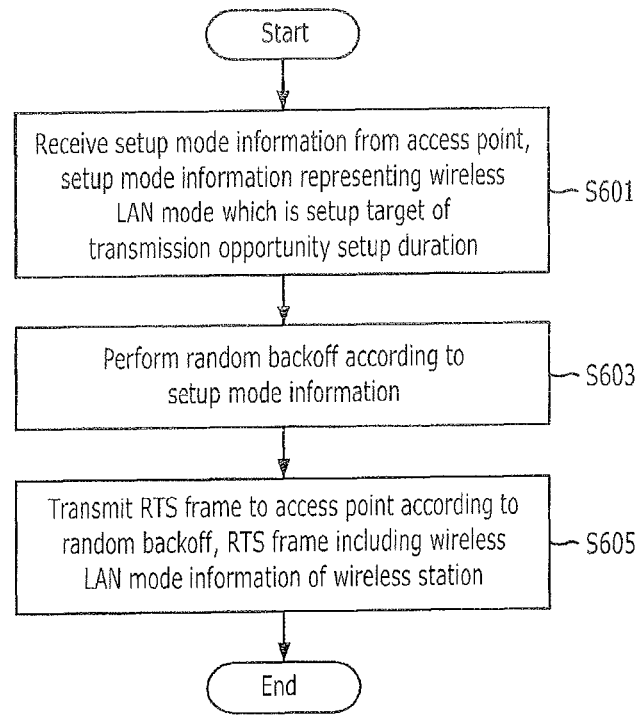

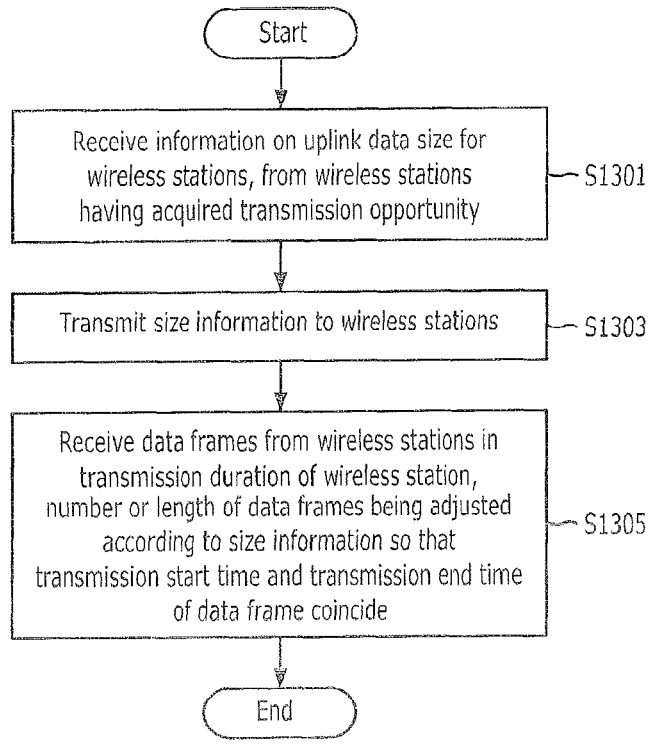
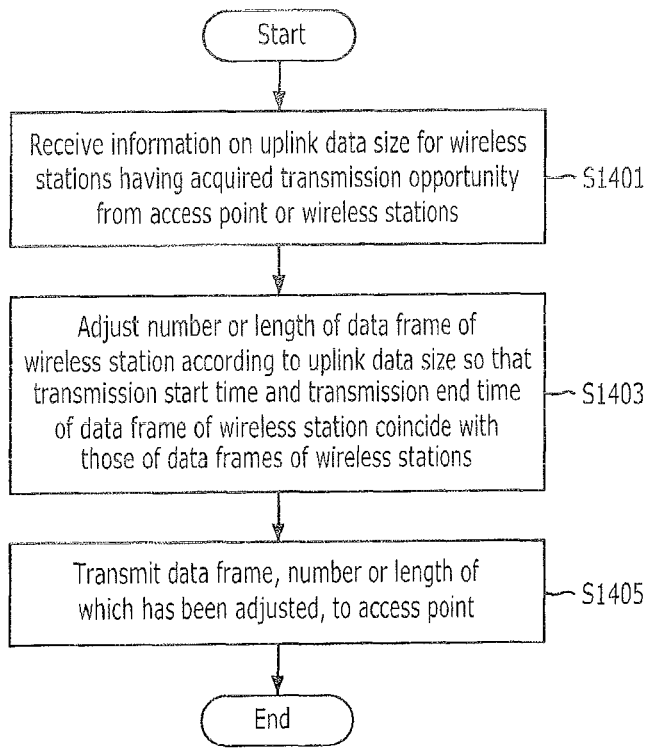

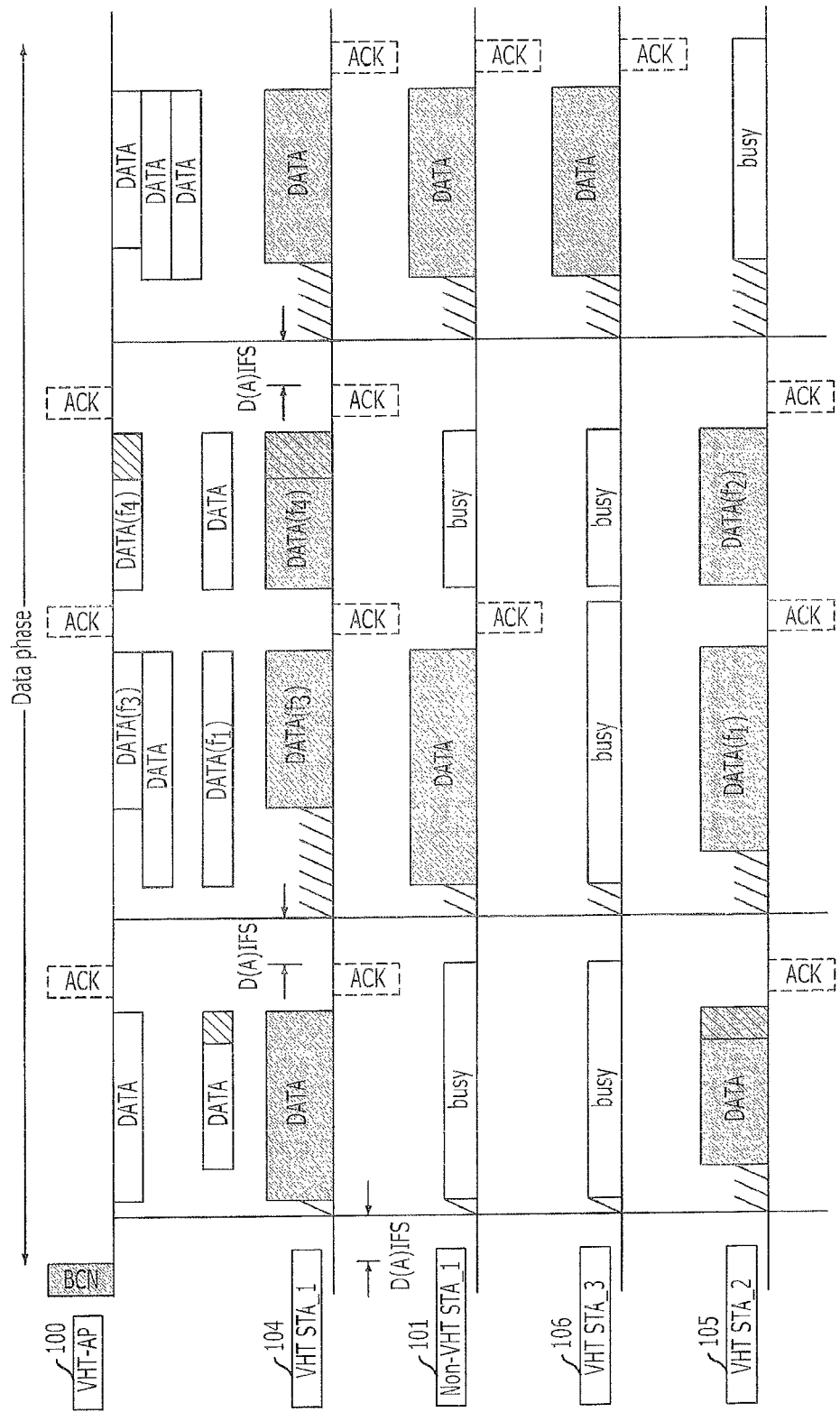

METHOD FOR SETTING TRANSMISSION OPPORTUNITY AND FOR TRANSMITTING AND RECEIVING DATA IN WIRELESS LAN SYSTEM USING MULTIPLE CHANNEL

CROSS-REFERENCE(S) TO RELATED APPLICATIONS

The present application claims priority of Korean Patent Application Nos. 10-2009-0003521, 10-2009-0003525 and 10-2009-0003527, filed on Jan. 15, 2009, which are incorporated herein by reference in their entirety.

BACKGROUND OF THE INVENTION

1. Field of the Invention

Exemplary embodiments of the present invention relate to a transmission opportunity setting method and a data transmitting/receiving method in a wireless LAN system using multiple channels; and, more particularly, to transmission opportunity setting methods of an access point and a wireless station and data transmitting/receiving methods thereof in a wireless LAN system using multiple channels.

2. Description of Related Art

Internet users have rapidly increased, and in particular, wireless LAN Internet users are increasing. A wireless LAN service is a service which provides an existing short-range wired communication service, i.e., a wired LAN service, by using a wireless medium as a data transmission medium. The Institute of Electrical and Electronics Engineers (IEEE) 802.11 Infrastructure scheme has been widely used as a wireless communication method. Wireless LAN technology has evolved into the IEEE 802.11n, which increases the data rate from the conventional level of tens of Mbps up to 600 Mbps.

A wireless LAN service enables a wireless station (STA), such as a notebook computer or a personal digital assistant (PDA), to receive a variety of services, e.g., a wireless Internet service, by using an access point which functions as a wired/wireless gateway. Specifically, a medium access control (MAC) protocol of a wireless LAN defined in the IEEE 802.11 basically supports a Basic Service Set (BSS) constituted by a wireless station and an access point which functions as an association point of a distributed system. The access point performs a function similar to a LAN hub. A single access point may provide a service to wireless stations placed in a preset service area. The service area refers to an area where the access point can provide a service to the wireless stations.

Recently, as wireless LAN users are rapidly increasing, there is a growing need for increasing data throughput which is provided in a single BSS, i.e., a wireless LAN system. To this end, much study has been conducted on systems which provide a wireless LAN service through multiple channels.

SUMMARY OF THE INVENTION

An embodiment of the present invention is directed to a transmission opportunity setting method and a data transmitting/receiving method in a wireless LAN system using multiple channels, which are capable of providing a high throughput service to a plurality of wireless stations.

Another embodiment of the present invention is directed to a transmission opportunity setting method and a data transmitting/receiving method in a wireless LAN system using multiple channels, which are capable of supporting compatibility with a plurality of wireless stations and improving the performance and service of quality (QoS) of the wireless LAN system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a transmission opportunity setting method in a wireless LAN system using multiple channels includes: receiving a request-to-send (RTS) frame from a wireless station, the RTS frame including information on a wireless LAN mode of the wireless station; and transmitting a clear-to-send (CTS) frame to the wireless station according to at least one of the number of remaining available channels among the multiple channels and the wireless LAN mode of the wireless station.

In accordance with another embodiment of the present invention, a transmission opportunity setting method in a wireless LAN system using multiple channels includes: transmitting a RTS frame to an access point, the RTS frame including information on a wireless LAN mode of a wireless station; and receiving a CTS frame transmitted from the access point according to at least one of the number of remaining available channels among the multiple channels and the wireless LAN mode of the wireless station.

In accordance with another embodiment of the present invention, a transmission opportunity setting method in a wireless LAN system using multiple channels includes: receiving a RTS frame from a first wireless station in a transmission opportunity setup duration, the RTS frame including information on a wireless LAN mode of the first wireless station; selecting the wireless LAN mode, which is included in the RTS frame initially transmitted in the transmission opportunity setup duration, as a setup target of the transmission opportunity setup duration; and transmitting a CTS frame to the first wireless station.

In accordance with another embodiment of the present invention, a transmission opportunity setting method in a wireless LAN system using multiple channels includes: receiving setup mode information from an access point, the setup mode information representing a wireless LAN mode which is a setup target in a transmission opportunity setup duration; performing a random backoff according to the setup mode information; and transmitting a RTS frame to the access point according to the random backoff, the RTS frame including information on a wireless LAN mode of a wireless station.

In accordance with an embodiment of the present invention, a transmission opportunity setting method in a wireless LAN system using multiple channels includes: transmitting a CTS frame to a wireless station in a transmission opportunity setup duration in response to a RTS frame transmitted from the wireless station; and transmitting a CTS-to-self (SCTS) frame, which is beamformed for the wireless station, to the wireless station, wherein a NAV value included in the SCTS frame is determined according to time at which the wireless station receives the SCTS frame in the transmission opportunity setup duration.

In accordance with another embodiment of the present invention, a transmission opportunity setting method in a wireless LAN system using multiple channels includes: transmitting a RTS frame to an access point in a transmission opportunity setup duration; receiving a CTS frame from the access point; and receiving a SCTS frame, which is beamformed for a wireless station, from the access point, wherein a NAV value included in the SCTS frame is determined according to time at which the wireless station receives the SCTS frame in the transmission opportunity setup duration.

In accordance with another embodiment of the present invention, a data receiving method in a wireless LAN system using multiple channels includes: receiving size information of uplink data with respect to a plurality of wireless stations, from the plurality of wireless stations having acquired transmission opportunity; transmitting the size information to the plurality of wireless stations; and receiving data frames from the plurality of wireless stations in a transmission duration of the wireless stations, the number or length of the data frame being adjusted according to the size information so that transmission start time and transmission end time of the data frames of the respective wireless stations coincide.

In accordance with another embodiment of the present invention, a data transmitting method of wireless station in a wireless LAN system using multiple channels includes: receiving information on uplink data size for a plurality of wireless stations, which have acquired transmission opportunity, from an access point or the plurality of wireless stations; adjusting the number or length of data frames of the wireless station according to the uplink data size so that transmission start time and transmission end time of the data frame of the wireless station coincide with those of the plurality of wireless stations; and transmitting the data frame, the number or length of which has been adjusted, to the access point.

BRIEF DESCRIPTION OF THE DRAWINGS

FIG. 5 illustrates a transmission opportunity setting method of an access point in a wireless LAN system using multiple channels in accordance with another embodiment of the present invention.

FIG. 6 illustrates a transmission opportunity setting method of a wireless station in a wireless LAN system using multiple channels in accordance with another embodiment of the present invention.

FIG. 13 illustrates a data receiving method of an access point in a wireless LAN system using multiple channels in accordance with an embodiment of the present invention.

FIG. 14 illustrates a data transmitting method of a wireless station in a wireless LAN system using multiple channels in accordance with an embodiment of the present invention.

FIG. 17 illustrates a data transmitting/receiving method in a wireless LAN system using multiple channels in accordance with another embodiment of the present invention.

DESCRIPTION OF SPECIFIC EMBODIMENTS

Figure 1:
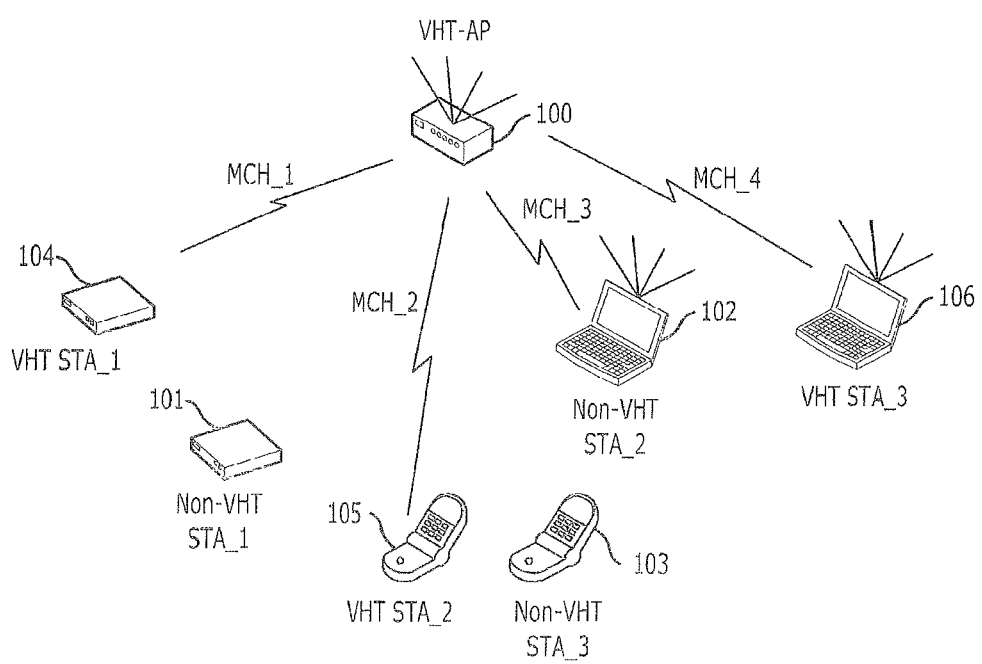
FIG. 1 illustrates a wireless LAN system using multiple channels in accordance with an embodiment of the present invention.

In order to guarantee a higher data rate than the above-described IEEE. 802.11n, a Task Group (TGac) has been created within the IEEE 802.11 Working Group (WG) to study next generation wireless LAN technology and is in the process of establishing a new standard to enable Gbps-level data transmission. For reference, the IEEE 802.11a/b/g standard, the IEEE 802.11e standard, and the IEEE 802.11n standard are referred to as a legacy mode, a QoS mode, and a High Throughput (HT) mode, respectively. In addition, the standard newly discussed by IEEE 802.11ac is referred to as a Very High Throughput (VHT) mode. Hereinafter, the wireless LAN mode except for the VHT mode will be referred to as a non-VHT mode.

Much study has been conducted on methods which simultaneously provide a wireless LAN service to a plurality of wireless station through multiple channels in the IEEE.802.11ac. In a VHT mode wireless LAN system, a wireless station acquires transmission opportunity in accordance with a frame exchange sequence of a request-to-send (RTS)/clear-to-send (CTS)/DATA/ACK defined in the IEEE 802.11 MAC specification, and transmits an uplink data frame to an access point.

While the non-VHT mode wireless LAN system provides a wireless LAN service through a single channel, the VHT mode wireless LAN system provides a wireless LAN service through multiple channels. Hence, the VHT mode wireless LAN system requires a transmission opportunity setting method for a wireless LAN system, i.e., a multiple channel basic service set (MUCH-BSS). Specifically, since the wireless LAN system using multiple channels may include a non-VHT wireless station as well as a VHT wireless station, it requires a transmission opportunity setting method which supports compatibility with a plurality of wireless stations.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 illustrates a wireless LAN system using multiple channels in accordance with an embodiment of the present invention. A wireless LAN system using four channels MCH_1 to MCH_4 will be described below with reference to FIG. 1 as an embodiment of the present invention.

Referring to FIG. 1, the wireless LAN system in accordance with the embodiment of the present invention includes an access point 100 and first to sixth wireless stations 101 to 106. The first to third wireless stations 101 to 103 are wireless stations having a non-VHT mode, e.g., a legacy mode, a QoS mode, or an HT mode, which does support a VHT mode. The access point 100 is a VHT access point which supports a VHT mode, and the fourth to sixth wireless stations 104 to 106 are VHT wireless stations which support a VHT mode.

The wireless LAN system in accordance with the embodiment of the present invention uses a 20-MHz bandwidth as a basic bandwidth in order for compatibility with a general wireless station defined in the IEEE 802.11 MAC specification, and may support a 40-MHz bandwidth according to the specification defined in the IEEE 802.11. The number of the multiple channels supported in the embodiment of the present invention may be changed according to the bandwidth.

The access point 100 controls the multiple channels MCH_1 to MCH_4 independently in accordance with a CSMA/CA protocol, and provides a wireless LAN service to the first to sixth wireless stations 101 to 106. In this case, the multiple channel configuration between the access point 100 and the wireless stations 101 to 106 is established according to the characteristics of the wireless stations 101 to 106 and the service characteristics required in the wireless stations 101 to 106. In an MU-MIMO physical layer of the access point which supports the multiple channels MCH_1 to MCH_4, different beams configured not to interfere the respective multiple channels MCH_1 to MCH_4 are used, and data may be transmitted to the wireless stations 101 to 106 through the multiple channels MCH_1 to MCH_6.

In the wireless LAN system of FIG. 1 which includes both the non-VHT wireless stations and the VHT wireless stations and uses the multiple channels, the compatibility of the wireless stations included in the wireless LAN system is guaranteed, and the wireless stations can acquire the transmission opportunity. That is, in accordance with the embodiment of the present invention, some wireless stations having acquired the transmission opportunity among the first to sixth wireless stations 101 to 106 in a transmission opportunity setup duration may receive a wireless LAN service through the multiple channels MCH_1 to MCH_4 in a data transmission/reception duration, i.e., a data phase.

The non-VHT wireless stations do not support the multiple channels and acquire the transmission opportunity with respect to a single channel. Thus, if the non-VHT wireless stations have already acquired the transmission opportunity with respect to the single channel even though the transmission opportunity is not set to the entire multiple channels, there may occur a problem in that the non-VHT wireless stations perform the data transmission/reception in the transmission opportunity setup duration. That is, in a case where the non-VHT wireless stations firstly transmit data to the access point, the access point may not receive data because the access point and the wireless stations cannot simultaneously perform the data transmission/reception in the wireless LAN system.

In accordance with the embodiment of the present invention, the wireless stations having acquired the transmission opportunity may transmit data to the access point in the data transmission/reception duration by enabling the non-VHT wireless stations to acquire the transmission opportunity with respect to one remaining channel among the multiple channels, or by setting an additional transmission opportunity setup duration for the non-VHT wireless stations and the VHT wireless stations. Furthermore, in accordance with the embodiment of the present invention, the above-mentioned problems may be solved in such a manner that a control signal enabling the non-VHT wireless stations to transmit data to the access point in the data transmission/reception duration is transmitted to the wireless stations.

The transmission opportunity setting methods of the access point and the wireless stations and the data transmitting/receiving methods thereof in the wireless LAN system using multiple channels of FIG. 1 will be described below in more detail with reference to FIGS. 2 to 17.

Figure 2:
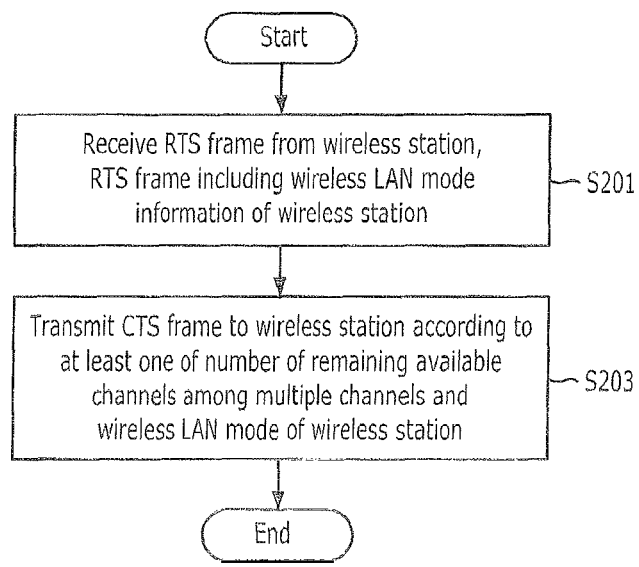
FIG. 2 illustrates a transmission opportunity setting method of an access point in a wireless LAN system using multiple channels in accordance with an embodiment of the present invention.

FIG. 2 illustrates a transmission opportunity setting method of an access point in a wireless LAN system using multiple channels in accordance with an embodiment of the present invention.

Referring to FIG. 2, the transmission opportunity setting method in accordance with the embodiment of the present invention starts with step S201. In this embodiment, the non-VHT wireless stations which do not support the multiple channels are enabled to perform the transmission opportunity setting process with respect to the last remaining available channel among the multiple channels.

At step S201, the access point receives a request-to-send (RTS) frame from the wireless station. The RTS frame includes wireless LAN mode information of the wireless station. The access point may confirm the non-VHT wireless station by receiving the wireless LAN mode information from the wireless station. The wireless station which intends to transmit uplink data to the access point acquires the transmission opportunity through a random backoff, and transmits the RTS frame to the access point.

At step S203, the access point transmits a clear-to-send (CTS) frame to the wireless station according to the number of the remaining available channels among the multiple channels and/or the wireless LAN mode of the wireless station. Specifically, the access point transmits the CTS frame to the wireless station in response to the RTS frame received from the wireless station, considering the number of the remaining available channels among the multiple channels and/or the wireless LAN mode of the wireless station.

As described above, since the non-VHT wireless station performs the transmission opportunity process with respect to the single channel, it is necessary to set the transmission opportunity with respect to the last remaining available channel to which the transmission opportunity is not set among the multiple channels. In accordance with the embodiment of the present invention, the non-VHT wireless station may acquire the transmission opportunity with respect to the last remaining available channel in such a manner that the access point transmits the CTS frame, considering the wireless LAN mode of the wireless station, which has transmitted the RTS frame, and/or the number of the remaining available channels among the multiple channels.

For example, in a case where the wireless LAN mode of the wireless station is the non-VHT mode and the number of the remaining available transmission channel is one, the access point may transmit the CTS frame to the wireless station. In a case where the number of the remaining available transmission channel is one or more, when the wireless station transmits the RTS frame, the access point does not transmit the CTS frame to the wireless station.

In a case where the wireless LAN mode of the wireless station is the VHT mode and the remaining available transmission channel exists, the access point may transmit the CTS frame to the wireless station. Since the VHT wireless station supports the multiple channels, the access point transmits the CTS frame to the VHT wireless station, only if the remaining available transmission channel exists, and transmits data to the access point when the transmission opportunity setup duration is finished.

Specifically, in accordance with the embodiment of the present invention, the compatibility is guaranteed, without regard to the wireless LAN mode of the wireless station included in the wireless LAN system using multiple channels, and the wireless station may transmit data in the data transmission/reception duration.

Figure 3:
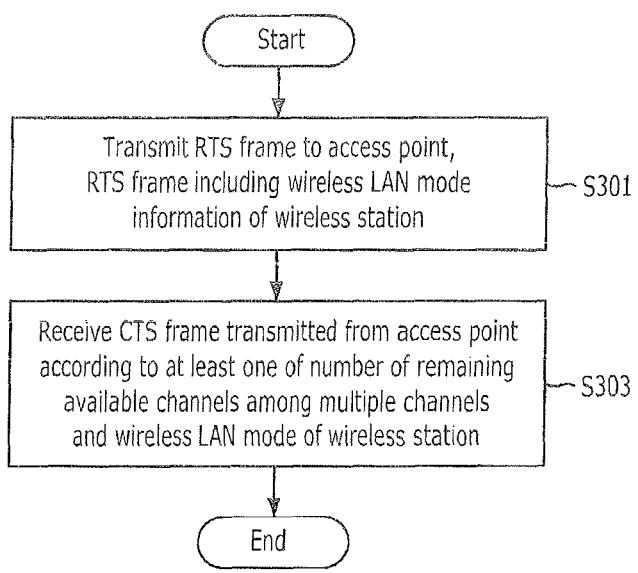
FIG. 3 illustrates a transmission opportunity setting method of a wireless station in a wireless LAN system using multiple channels in accordance with an embodiment of the present invention.

FIG. 3 illustrates a transmission opportunity setting method of a wireless station in a wireless LAN system using multiple channels in accordance with an embodiment of the present invention.

Referring to FIG. 3, the transmission opportunity setting method in accordance with the embodiment of the present invention starts with step S301.

At step S301, the wireless station transmits an RTS frame to the access point. The RTS frame includes wireless LAN mode information of the wireless station. More specifically, the wireless station which intends to transmit uplink data to the access point acquires the transmission opportunity through a random backoff, and transmits the RTS frame to the access point. At this time, the wireless station transmits the RTS frame including its wireless LAN mode information to the access point.

At step S303, the wireless station receives a CTS frame transmitted from the access point, according to the number of the remaining available channels among the multiple channels and/or the wireless LAN mode of the wireless station. That is, as described above, since the non-VHT wireless station performs the transmission opportunity setting process with respect to the single channel, the access point transmits the CTS frame to the wireless station, considering the number of the remaining available channels among the multiple channels and/or the wireless LAN mode of the wireless station.

In a case where the wireless LAN mode of the wireless station is the non-VHT mode and the number of the remaining available channels is one, the wireless station may receive the CTS frame transmitted from the access point. The wireless station having received the CTS frame may transmit an uplink data frame to the access point in the data transmission/reception duration.

That is, in accordance with the embodiment of the present invention, the compatibility is guaranteed, without regard to the wireless LAN mode of the wireless station included in the wireless LAN system using multiple channels, and the wireless station may transmit data in the data transmission/reception duration.

Figure 4:
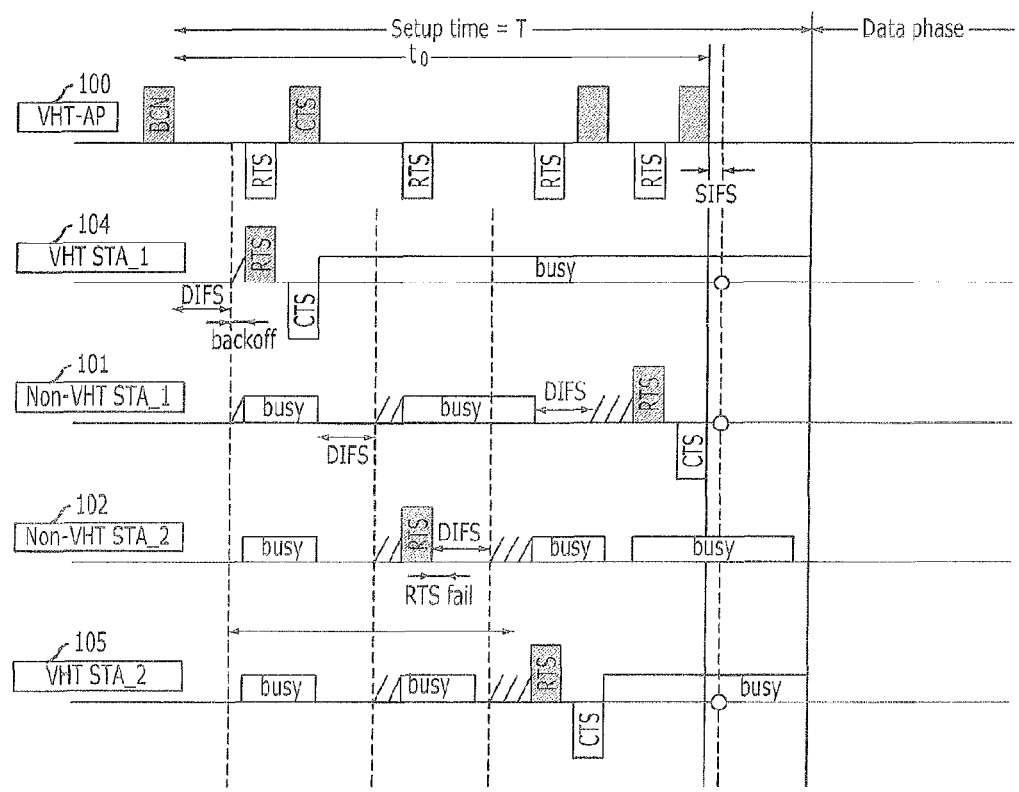
FIG. 4 illustrates a specific embodiment of the transmission opportunity setting methods described with reference to FIGS. 2 and 3.

FIG. 4 illustrates a specific embodiment of the transmission opportunity setting methods described above with reference to FIGS. 2 and 3. A case where the first and second wireless stations 101 and 102 and the fourth and fifth wireless stations 104 and 105 perform a process of acquiring transmission opportunity with respect to three multiple channels will be described below with reference to FIG. 4 as an embodiment of the present invention. In FIG. 4, transmission frames are shown above the horizontal lines, and reception frames are shown below the horizontal lines. Also, the RTS frame includes the wireless LAN mode information.

The access point 100 broadcasts a beacon frame BCN, and the first and second wireless stations 101 and 102 and the fourth and fifth wireless stations 104 and 105 perform a random backoff after a DCF Interframe Space, Arbitration Interframe Space (D(A)IFS).

The fourth wireless station 104 having acquired the transmission opportunity according to the random backoff transmits an RTS frame to the access point 100, and the access point 100 transmits a CTS frame to the fourth wireless station 104 in response to the RTS frame. At this time, the access point 100 may transmit the CTS frame whose network allocation vector (NAV) value is zero. When the NAV value is zero, the first and second wireless stations 101 and 102 and the fifth wireless station 105 may set the channel from a busy state to an idle state by resetting the NAV value to, and perform a random backoff in order to acquire a next transmission opportunity. In this case, the first and second wireless stations 101 and 102 and the fifth wireless station 105 perform a random backoff after a D(A)IFS.

Subsequently, when the second non-VHT wireless station 102 transmits an RTS frame, the access point 100 does not respond to the RTS frame and does not transmit a CTS frame. When the first wireless station 101 transmits an RTS frame to the access point 100 after the fifth wireless station 105 acquires the transmission opportunity, the access point 100 transmits a CTS frame to the first wireless station 101 in response to the RTS frame.

Since the number of the remaining available channels among the multiple channels is not one but two when the second non-VHT wireless station 102 transmits an RTS frame, the access point 100 does not transmit the CTS frame. However, since the number of the remaining available channels is one when the first non-VHT wireless station 101 transmits an RTS frame, the access point 100 transmits the CTS frame.

Therefore, in accordance with the embodiment of the present invention, the non-VHT wireless station may acquire the transmission opportunity with respect to the last remaining available channel among the multiple channels, and the first wireless station 101 and the fourth and fifth wireless stations 104 and 105 may transmit data in the data transmission/reception duration.

Meanwhile, when the transmission opportunity setup duration $t_0$ is finished, the first wireless station 101 and the fourth and fifth wireless stations 104 and 105 having acquired the transmission opportunity transmit uplink data to the access point 100 in the data transmission/reception duration after a short interframe space (SIFS). If the time $t_0$ at which the transmission opportunity with respect to the three multiple wireless channels is allocated is less than a preset setup time T, the transmission start time of the wireless station having acquired the transmission opportunity is determined after the elapse of $t_0$ and the SIFS. If the time $t_0$ is greater than the preset setup time T, the data transmission is performed after the time of T+SIFS even though the transmission opportunity of the three wireless channels is not acquired. In summary, the preset setup time refers to the time for the transmission opportunity setup of the wireless station, and the transmission opportunity setup duration is a duration which is included in the preset setup time and at which the practical transmission opportunity setup of the wireless station is completed.

FIG. 5 illustrates a transmission opportunity setting method of an access point in a wireless LAN system using multiple channels in accordance with another embodiment of the present invention.

Referring to FIG. 5, the transmission opportunity setting method in accordance with the embodiment of the present invention starts with step S501. In accordance with the embodiment of the present invention, the transmission opportunity is set to the wireless stations, while discriminating the transmission opportunity setup targets into the VHT mode and the non-VHT mode in the transmission opportunity setup duration. For example, the VHT wireless station may acquire the transmission opportunity in the transmission opportunity setup duration at one time, and the non-VHT wireless station may acquire the transmission opportunity in the transmission opportunity setup phase at another time.

At step S501, the access point receives the RTS frame from the first wireless station in the transmission opportunity setup duration. The RTS frame includes the wireless LAN mode information of the first wireless station.

At step S503, the access point selects the wireless LAN mode, which is included in the RTS frame initially transmitted in the transmission opportunity setup duration, as the setup target of the transmission opportunity setup duration. That is, the wireless LAN mode which is the transmission opportunity setup target in the transmission opportunity setup duration may be determined according to the wireless LAN mode of the wireless station which initially transmits the RTS frame in the transmission opportunity setup duration.

At step S505, the access point transmits the CTS frame to the first wireless station. The first wireless station may transmit an uplink data frame to the access point in the subsequent data transmission/reception duration.

The NAV value may be set in the CTS frame, or selection information may be included in the NAV value. Thus, the wireless station which transmits an RTS frame may be selected according to the setup target in the transmission opportunity setup duration. For example, when the setup target in the transmission opportunity setup duration is the non-VHT mode, the non-VHT wireless station may set a virtual channel to a busy state according to the NAV value included in the CTS frame, and may not transmit the RTS frame. Alternatively, the selection information may be included in the CTS frame. Another wireless station included in the wireless LAN system using multiple channels may receive the CTS frame and confirm the setup target of the current transmission opportunity setup duration. The wireless station may not transmit the RTS frame when the wireless LAN mode of the wireless station does not coincide with the setup target of the transmission opportunity setup duration.

Moreover, the access point also may transmit the CTS frame to the wireless station according to the wireless LAN mode information included in the RTS frame. Specifically, in accordance with the embodiment of the present invention, the access point receives the RTS frame, which includes the wireless LAN mode information of the second wireless station, from the second wireless station. The access point determines whether the wireless LAN mode of the second wireless station coincides with the setup target. The access point transmits the CTS frame to the second wireless station according to the determination result. When the wireless LAN mode of the second wireless station does not coincide with the setup target, the access point does not transmit the CTS frame to the second wireless station.

Meanwhile, the non-VHT mode and the VHT mode may be sequentially selected as the setup target of the transmission opportunity setup duration in accordance with the preset rule, depending on system design.

FIG. 6 illustrates a transmission opportunity setting method of a wireless station in a wireless LAN system using multiple channels in accordance with another embodiment of the present invention.

Referring to FIG. 6, the transmission opportunity setting method in accordance with the embodiment of the present invention starts with step S601.

At step S601, the wireless station receives setup mode information from the access point. The setup mode information represents the wireless LAN mode which is the setup target of the transmission opportunity setup phase. The wireless station may confirm the setup target of the transmission opportunity setup phase by using the setup mode information. The setup mode information may be included in the CTS frame and transmitted from the access point.

At step S603, the wireless station performs a random backoff according to the setup mode information. In a case where the wireless LAN mode of the wireless station is the non-VHT mode and the setup target of the transmission opportunity setup duration is the VHT mode, the wireless station does not perform a random backoff. In this case, the setup mode information may be an NAV value included in the CTS frame, and the wireless station may set a virtual channel to a busy state according to the NAV value and may not perform a random backoff.

In a case where the wireless LAN mode of the wireless station is the VHT mode, the wireless station may detect that a practical external channel is in an idle state and may perform a random backoff, in spite of the NAV value.

At step S605, the wireless station transmits an RTS frame to the access point according to the random backoff. The RTS frame includes the wireless LAN mode information of the wireless station. That is, when the wireless LAN mode coincides with the setup target of the transmission opportunity setup duration, the wireless station may transmit an uplink data frame to the access point in the data transmission/reception duration.

Figure 7:
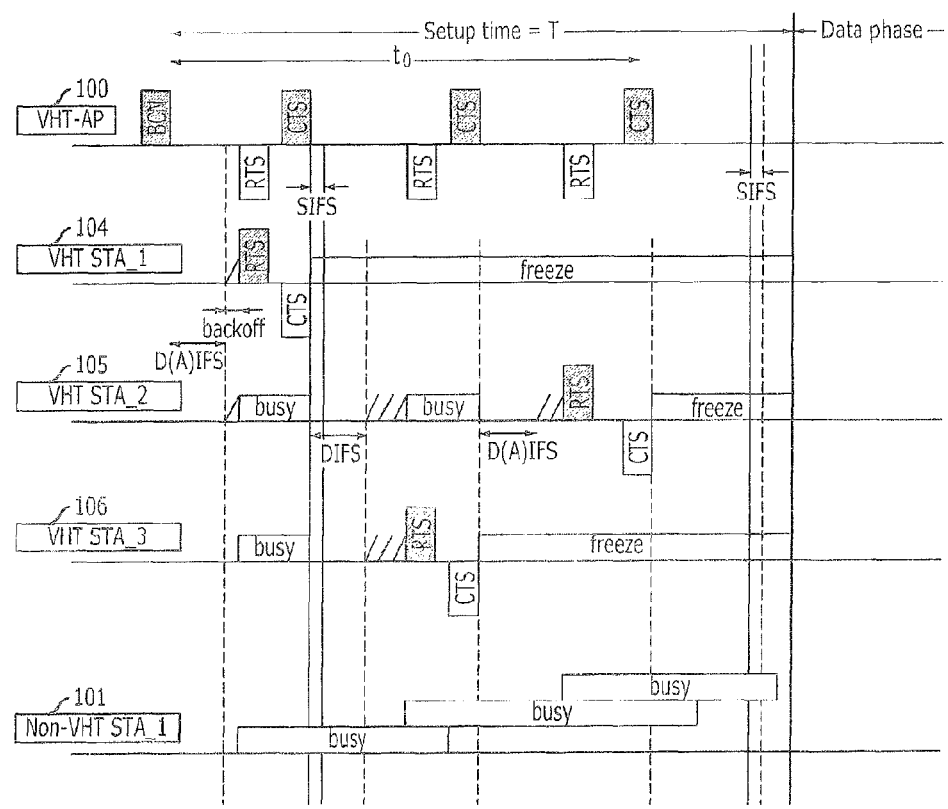
FIGS. 7 and 8 illustrate a specific embodiment of the transmission opportunity setting methods described with reference to FIGS. 5 and 6.
Figure 8:
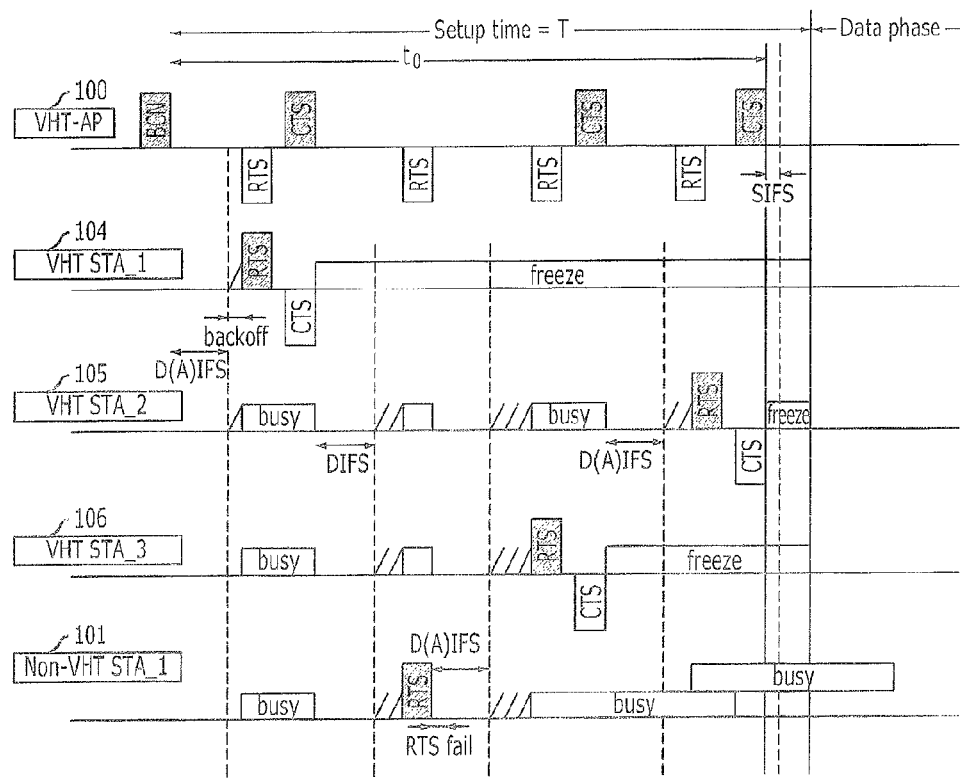

FIGS. 7 and 8 illustrate specific embodiments of the transmission opportunity setting methods described above with reference to FIGS. 5 and 6. A case where the first wireless station 101 and the fourth to sixth wireless stations 104 to 106 perform a process of acquiring the transmission opportunity with respect to three multiple channels will be described below with reference to FIG. 7 as an embodiment of the present invention. In FIG. 7, transmission frames are shown above the horizontal lines, and reception frames are shown below the horizontal lines. Also, the RTS frame includes the wireless LAN mode information.

Referring to FIG. 7, the access point 100 broadcasts a beacon frame BCN, and the first wireless station 101 and the fourth to sixth wireless stations 104 to 106 perform a random backoff after a D(A)IFS. The fourth wireless station 104 having initially acquired the transmission opportunity transits an RTS frame to the access point 100. The access point 100 having received the RTS frame selects the VHT mode as the setup target of the transmission opportunity setup duration, and transmits a CTS frame to the fourth wireless station 104.

At this time, the first wireless station 101 and the fifth and sixth wireless stations 105 and 106 having received the CTS frame set the virtual channel to a busy state according to the NAV value included in the RTS or CTS frame. The NAV value may be determined for the first non-VHT wireless station 101 not to perform a random backoff in the transmission opportunity setup duration.

As described above, since the setup target in the transmission opportunity setup duration is the VHT mode, the NAV value included in the CTS frame is set for the first non-VHT wireless station 101 not to transmit the RTS frame. The fifth and sixth wireless stations 105 and 106 may detect that the practical external channel is in an idle state and perform a random backoff according to the NAV value, even though the virtual channel is in a busy state. The first wireless station 104 having already acquired the transmission opportunity is frozen, that is, it does not perform a random backoff any more.

Subsequently, the fifth and sixth wireless stations 105 and 106 perform a random backoff to acquire a transmission opportunity, and the first wireless station 101 sets the virtual channel to a busy state according to the NAV value included in the CTS or RTS frame transmitted to the fifth and sixth wireless stations 105 and 106.

As illustrated in FIG. 8, in a case where the first wireless station 101 abruptly enters the wireless LAN system and transmits the RTS frame to the access point 100, the access point 100 confirms the wireless LAN mode of the first wireless station 101 and does not transmits the CTS frame to the first wireless station 101. In this case, the wireless LAN mode information may be included in the RTS frame of the first wireless station 101.

Therefore, in accordance with the embodiment of the present invention, the transmission opportunity may be set to the wireless stations according to the wireless LAN mode which is the setup target of the transmission opportunity setup duration. When the transmission opportunity is set to the three multiple channels, the wireless stations having acquired the transmission opportunity transmit data to the access point in the data transmission/reception duration.

Figure 9:
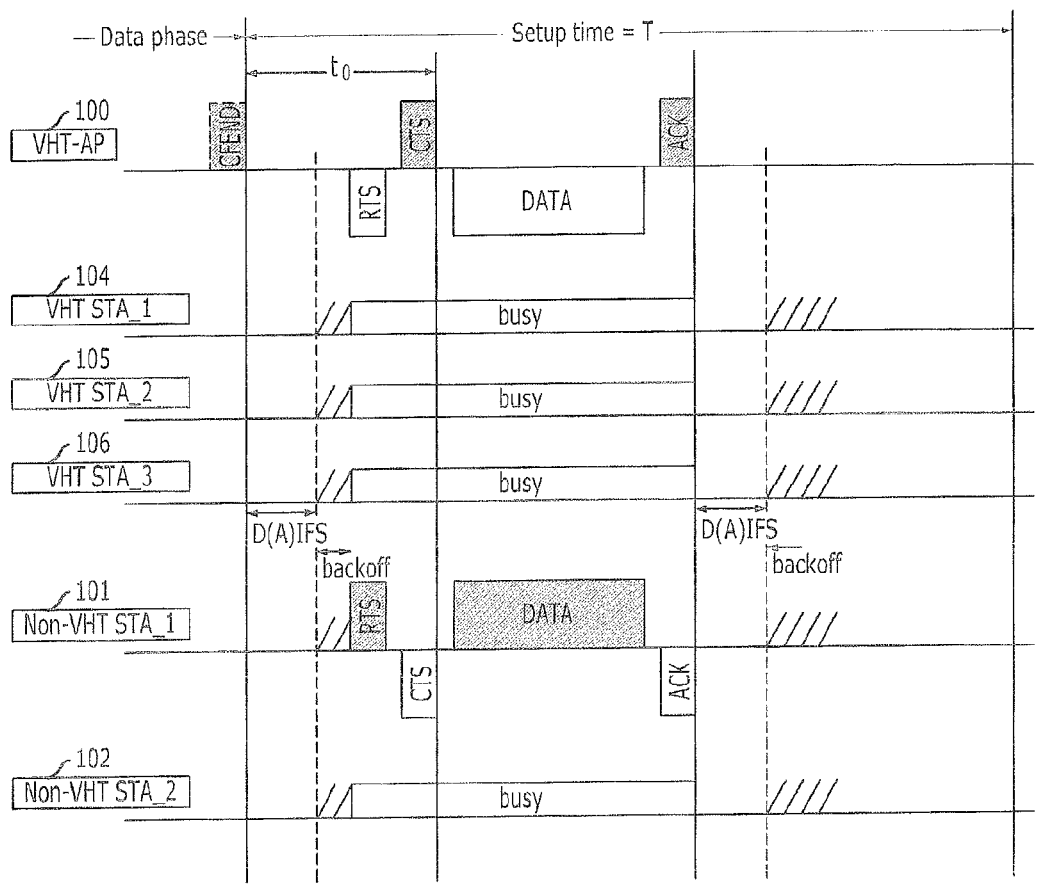
FIG. 9 illustrates another specific embodiment of the transmission opportunity setting methods described with reference to FIGS. 5 and 6.

FIG. 9 illustrates another specific embodiment of the transmission opportunity setting methods described above with reference to FIGS. 5 and 6. Unlike the case of FIG. 8, a case where the non-VHT mode is selected as the setup target in the transmission opportunity setup duration will be described below with reference to FIG. 9 as an embodiment of the present invention.

When the first non-VHT wireless station 101 acquires the transmission opportunity, the transmission opportunity setup duration $t_0$ is finished, and the first wireless station 101 transmits a data frame to the access point 100 in the data transmission/reception duration. The non-VHT wireless station does not support the multiple channels. Thus, in a case where the non-VHT mode is selected as the setup target of the transmission opportunity setup duration, when the transmission opportunity is set to a single channel, the data is transmitted/received immediately after an SIFS.

Figure 10:
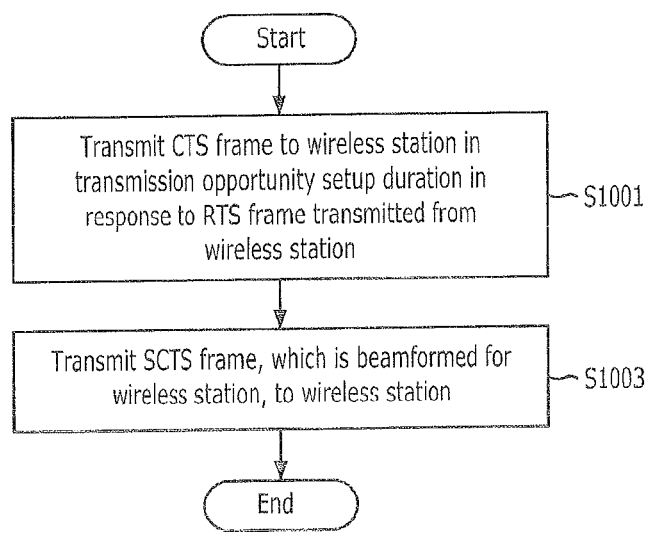
FIG. 10 illustrates a transmission opportunity setting method of an access point in a wireless LAN system using multiple channels in accordance with another embodiment of the present invention.

FIG. 10 illustrates a transmission opportunity setting method of an access point in a wireless station using multiple channels in accordance with another embodiment of the present invention.

Referring to FIG. 10, the transmission opportunity setting method in accordance with the embodiment of the present invention starts with step S1001. In this embodiment, a control signal enabling the non-VHT wireless station to transmit data to the access point in the data transmission/reception duration is transmitted to the wireless stations. In this way, the wireless stations having acquired the transmission opportunity may transmit data in the data transmission/reception duration.

At step S1001, the access point transmits a CTS frame to the wireless station in the transmission opportunity setup duration in response to the RTS frame transmitted from the wireless station. At this time, the NAV value included in the CTS frame may be zero. Since the NAV value is zero, other wireless stations included in the wireless LAN system may perform a random backoff.

At step S1003, the access point transmits a beamformed CTS-to-self (SCTS) frame to the wireless station. In this case, the NAV value included in the SCTS frame is determined according to the time at which the wireless station receives the SCTS frame in the transmission opportunity setup duration.

Therefore, even though the wireless LAN mode of the wireless station included in the wireless LAN system is the non-VHT mode, the wireless station immediately performs a backoff according to the NAV value included in the CTS frame. The wireless station having acquired the transmission opportunity sets a virtual channel to a busy state according to the NAV value included in the SCTS frame and waits for the data transmission/reception duration.

In this case, the access point may transmit the SCTS frame after elapse of a reduced interframe spacing (RFIS) from the transmission of the CTS frame. The RFIS is newly defined in the IEEE 802.11n in order to further reduce the delay.

Figure 11:
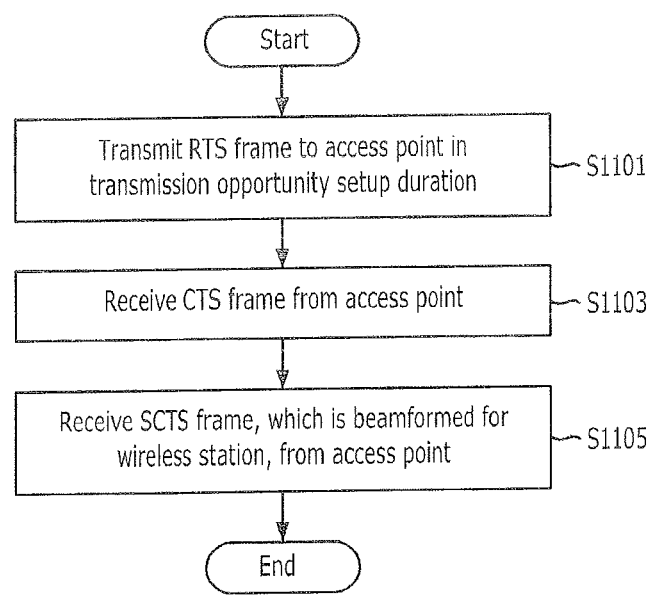
FIG. 11 illustrates a transmission opportunity setting method of a wireless station in a wireless LAN system using multiple channels in accordance with another embodiment of the present invention.

FIG. 11 illustrates a transmission opportunity setting method of a wireless station in a wireless LAN system using multiple channels in accordance with another embodiment of the present invention.

Referring to FIG. 11, the transmission opportunity setting method in accordance with the embodiment of the present invention starts with step S1101.

At step S1101, the wireless station transmits an RTS frame to the access point in the transmission opportunity setup duration. The wireless station may transmit the RTS frame through a random backoff.

At step S1103, the wireless station receives a CTS frame from the access point. At this time, an NAV value included in the CTS frame may be zero in order for a random backoff of other wireless stations included in the wireless LAN system.

At step S1105, the wireless station receives a SCTS frame beamformed for the wireless station from the access point. In this case, an NAV value included in the SCTS frame is determined according to the time at which the wireless station receives the SCTS frame in the transmission opportunity setup duration. The NAV value may be the time from the SCTS frame reception time of the wireless station to the end time of the transmission opportunity setup duration. By transmitting the beamformed SCTS frame to the wireless station, the wireless station may set a virtual channel to a busy state, without regard to the NAV value included in the CTS frame.

Figure 12:
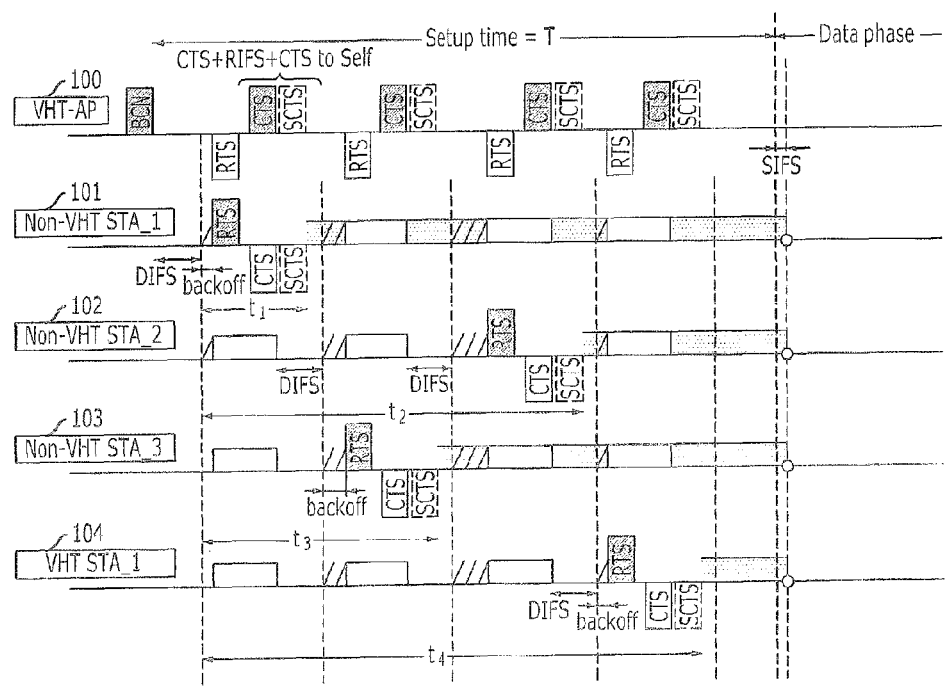
FIG. 12 illustrates a specific embodiment of the transmission opportunity setting methods described above with reference to FIGS. 10 and 11.

FIG. 12 illustrates a specific embodiment of the transmission opportunity setting methods described above with reference to FIGS. 10 and 11. A case where the first to third wireless stations 101 to 103 and the fourth wireless station 104 perform a process of acquiring the transmission opportunity with respect to four multiple channels will be described below with reference to FIG. 12 as an embodiment of the present invention. In FIG. 12, transmission frames are shown above the horizontal lines, and reception frames are shown below the horizontal lines.

Referring to FIG. 12, the access point 100 broadcasts a beacon frame BCN, and the first to third wireless stations 101 to 103 and the fourth wireless station 104 perform a random backoff. The first wireless station 101 having initially acquired the transmission opportunity transmits an RTS frame to the access frame 100, and the access point 100 transmits a CTS frame, the NAV value of which is zero, to the first wireless station 101.

Since the NAV value included in the CTS frame is zero, the second to fourth wireless stations 102 to 104 set a virtual channel to an idle state. The second to fourth wireless stations 102 to 104 transmit CTS frames and perform a random backoff after the D(A)IFS.

After the RIFS (Retransmission IFS), the access point 100 transmits an SCTS frame beamformed for the wireless station 101. The NAV value included in the SCTS frame is determined according to the time at which the first wireless station 101 receives the SCTS frame in the transmission opportunity setup duration. When the time at which the first wireless station 101 receives the SCTS frame is $t_1$ and the preset transmission setup time is T, the NAV value included in the SCTS frame may be $T-t_1$. The first wireless station 101 sets a virtual channel to a busy state according to the NAV value included in the SCTS frame.

Since the SCTS frame is a frame beamformed for the first wireless station 101, the second to fourth wireless stations 102 to 104 may not set the virtual channel to a busy state according to the NAV value included in the SCTS frame.

Then, like the first wireless station 101, the second to fourth wireless stations 102 to 104 receive the CTS frame and the beamformed SCTS frame and acquire the transmission opportunity.

Therefore, in accordance with the embodiment of the present invention, since the beamformed SCTS frame having the preset NAV value is used, the first to third non-VHT wireless stations 101 to 103 and the fourth VHT wireless station 104 may acquire the transmission opportunity.

Meanwhile, as described above, the plurality of wireless stations having acquired the transmission opportunity transmit uplink data frames to the access point in the data transmission/reception duration. When the data frames transmitted by the plurality of wireless stations are different in size, problems may occur during data transmission/reception.

More specifically, the access point and the wireless stations in the wireless LAN system may not transmit/receive data at the same time. That is, when the wireless station transmits data, the access point can receive data but cannot transmit data. Therefore, the data frame transmission and the ACK frame transmission are alternately performed between the access point and the wireless stations. If the data frames transmitted from the plurality of wireless stations are different in size, the data frame transmission start time and the ACK frame transmission start time in the respective wireless stations may be different.

Consequently, to solve the above-described problems, it is necessary to control the size or length of the data frames when the respective wireless stations transmit the data frames to the access point. The following description will be made on data transmitting/receiving methods which are capable of solving the above-described problems by adjusting the number or length of the uplink data frames, or the transmission start time of the data frames.

FIG. 13 illustrates a data receiving method of an access point in a wireless LAN system using multiple channels in accordance with an embodiment of the present invention.

Referring to FIG. 13, the data receiving method in accordance with the embodiment of the present invention starts with step S1301.

At step S1301, the access point receives information on uplink data size for the respective wireless stations from the wireless stations having acquired the transmission opportunity. The access point may acquire size information through the size information included in RTS frames transmitted from the wireless stations having acquired the transmission opportunity.

At step S1303, the access point transmits the size information to the wireless stations. Due to the transmission of the size information to the wireless stations, the respective wireless stations may adjust the length or number of their data frames, considering uplink data frames of other wireless stations. The access point may transmit size information by generating control frames beamformed for the wireless stations, or may transmit size information to the wireless stations by adding the size information to the SCTS frames beamformed for the wireless stations.

At step S1305, the access point receives from the wireless stations the data frames, the number or length of which has been adjusted according to the size information so that the transmission start time and transmission end time of the data frames of the respective wireless stations coincide in the transmission duration of the wireless stations.

The transmission duration of the wireless stations corresponds to the above-described data transmission/reception duration. The respective wireless stations may adjust the number or length of the data frames by fragmenting the uplink data frames or adding null data to the uplink data frames by using the size information. Alternatively, the respective wireless stations may adjust the transmission start time of the data frames.

FIG. 14 illustrates a data transmitting method of a wireless station in a wireless LAN system using multiple channels in accordance with an embodiment of the present invention.

Referring to FIG. 14, the data transmitting method in accordance with the embodiment of the present invention starts with step S1401.

At step S1401, the wireless stations receive information on uplink data size for the wireless stations, which have acquired the transmission opportunity, from the access point or the wireless stations. The wireless stations may receive information on the uplink data size for the respective wireless stations through RTS frames transmitted from the wireless stations to the access point. Alternatively, as described above with reference to FIG. 13, the wireless stations may receive the size information transmitted from the access point.

At step S1403, the wireless stations adjust the number or length of the data frames of the wireless stations according to the uplink data size, so that the transmission start time and transmission end time of the data frame of the wireless station coincide with those of the wireless stations in the data transmission/reception duration. The wireless stations may adjust the number or length of the data frames by fragmenting the data frames of the wireless stations or adding null data to the data frames of the wireless stations. Alternatively, the wireless stations may adjust the transmission start time of the data frames.

At step S1405, the wireless stations transmit the data frames, the number or length of which has been adjusted, to the access point. Therefore, the data frame reception end time of the access point may coincide, and the access point may transmit the ACK frame to the wireless stations at the same time.

Figure 15:
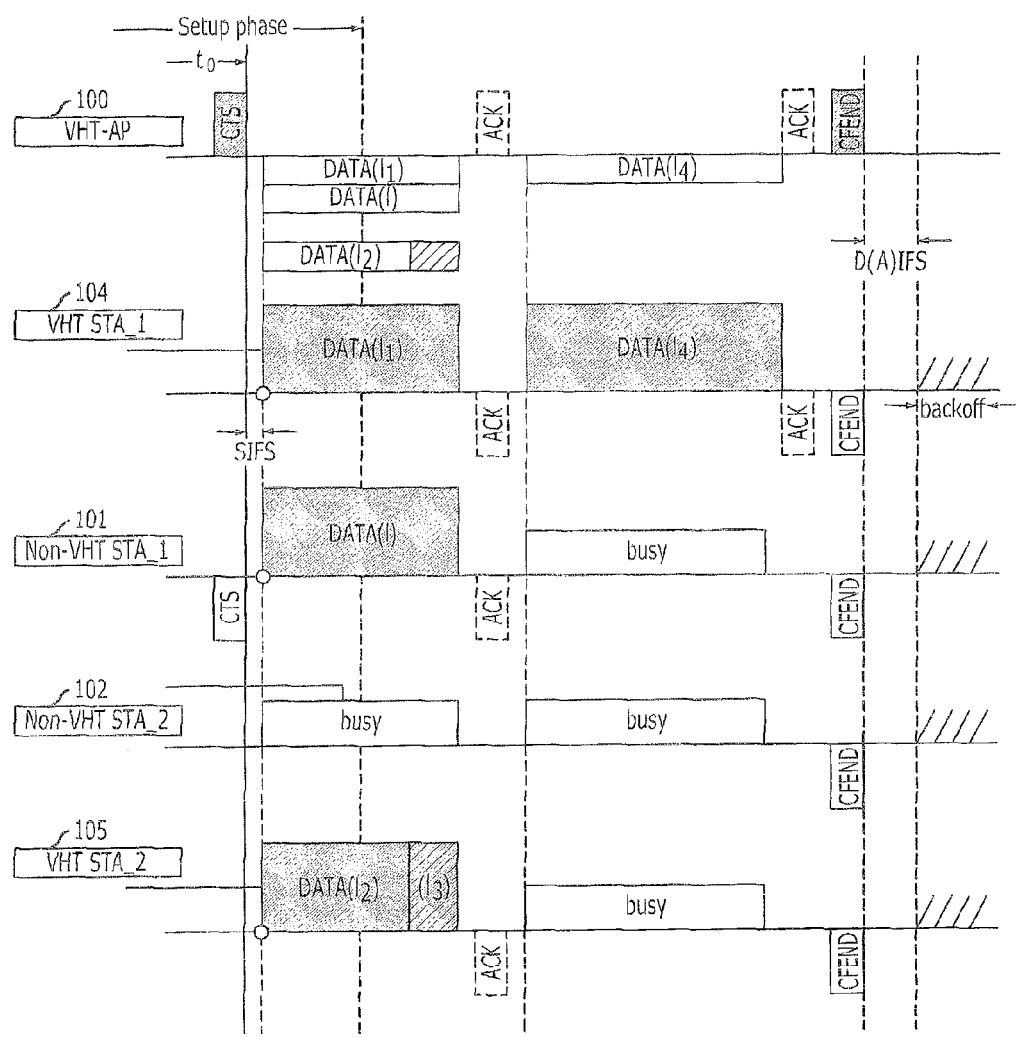
FIG. 15 illustrates a specific embodiment of the data transmitting/receiving methods described above with reference to FIGS. 13 and 14.

FIG. 15 illustrates a specific embodiment of the data transmitting/receiving methods described above with reference to FIGS. 13 and 14. A case where the first wireless station 101 and the fourth and fifth wireless stations 104 and 105 having acquired the transmission opportunity transmit the data frames will be described below with reference to FIG. 15 as an embodiment of the present invention.

Specifically, a case where the wireless stations receive size information of data frames for the wireless stations from the respective wireless stations in the wireless LAN system will be described below with reference to FIG. 15 as an embodiment of the present invention. As described above, the first wireless station 101 and the fourth and fifth wireless stations 104 and 105 may confirm data size of other wireless stations by using RTS frames transmitted from the wireless stations 101, 104 and 105.

The lengths of the uplink data of the first wireless station 101 and the fourth and fifth wireless stations 104 and 105 are l, $l_1+l_4$, and $l_2$ respectively. The fourth and fifth wireless stations 104 and 105 adjust the length or number of their data frames according to the length of the data frames. Specifically, the fourth wireless station 104 fragments the data frame into sub data frames, the lengths of which are $l_1$ and $l_4$, respectively, so that the transmission start time and transmission end time of the data frame of the fourth wireless station 104 coincide with those of the first wireless station 101. The fifth wireless station 105 adds null data having the length of $l_3$ to the data frame so that the transmission start time and transmission end time of the data frame of the fifth wireless station 105 coincide with those of the first wireless station 101. The data frames may be MPDU.

When the data frame length of the first wireless station 101 is longest, null data may be added to the data frame of the first wireless station 101. The null data may be added to the front or rear portion of the data frame. In stead of adding the null data, the fifth wireless station 105 may delay the transmission start time of the data frame so that the transmission end time of the data frame coincides.

The access point 100 having received the data frames having the same transmission end time may simultaneously transmit the ACK frame to the first wireless station 101 and the fourth and fifth wireless stations 104 and 105 after an SIFS. Thereafter, the transmission opportunity setup duration may be again started by a CF-END frame of the access point 100. The first and second wireless stations 101 and 102 and the fourth and fifth wireless stations 104 and 105 reset the NAV value and again perform a random backoff.

Figure 16:
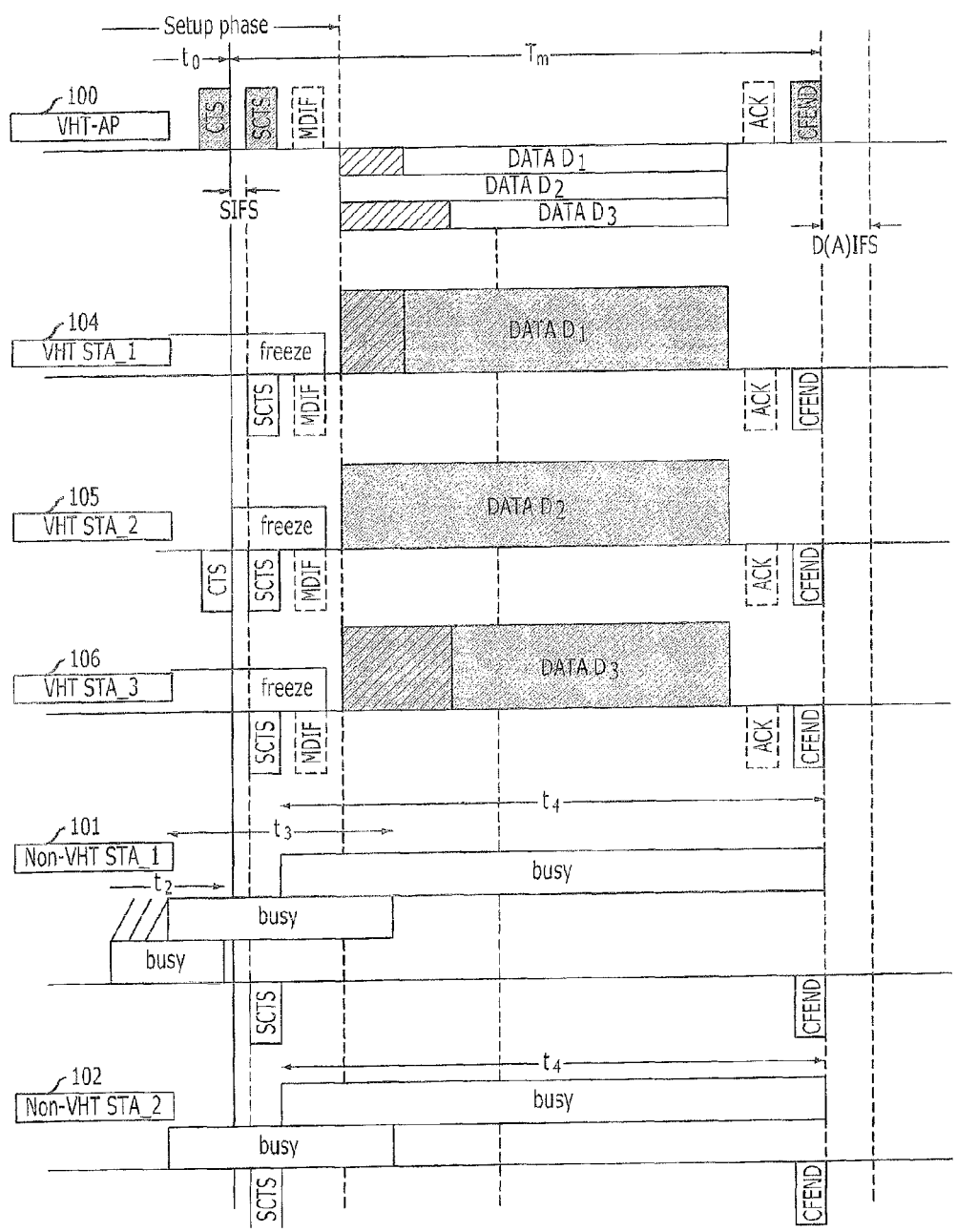
FIG. 16 illustrates another specific embodiment of the data transmitting/receiving methods described above with reference to FIGS. 13 and 14.

FIG. 16 illustrates another specific embodiment of the data transmitting/receiving methods described above with reference to FIGS. 13 and 14. A case where the fourth to sixth wireless stations 104 to 106 having acquired the transmission opportunity transmit data frames will be described below with reference to FIG. 16 as an embodiment of the present invention.

Unlike the embodiment of FIG. 15, the access point 100 transmits information on the data frame size to the fourth to sixth wireless stations 104 to 106. The access point 100 generates a beamformed control frame DMIF and transmits the beamformed control frame DMIF to the fourth to sixth wireless stations 104 to 106. In this way, information on uplink data size of the fourth to sixth wireless stations 104 to 106 is transmitted to the fourth to sixth wireless stations 104 to 106.

In this case, the access point 100 may transmit an SCTS frame having a duration value of $T_m$. The SCTS frame is transmitted in order to solve the problem of hidden nodes and completely avoid collision in channels. The non-VHT wireless stations 101 and 102 which have not acquired the transmission opportunity set the virtual channels to a busy state. The fourth to sixth wireless stations 104 to 106 may set the virtual channels to a busy state according to the NAV value included in the control frame MDIF.

The uplink data frames of the fourth to sixth wireless stations 104 to 106 are $D_1$, $D_2$ and $D_3$. The fourth and sixth wireless stations 104 and 106 adjust their data frame length according to the data frame length of the fifth wireless station 105. Specifically, the fourth and sixth wireless stations 104 and 106 add null data to the data frame so that the transmission start time and transmission end time of their data frames coincide with those of the data frame of the fifth wireless station 105. In FIG. 16, shaded parts of $D_1$ and $D_2$ represent the null data. The data frames may be MPDU.

As described above with reference to FIG. 15, instead of adding the null data, the fourth and sixth wireless stations 104 and 106 may delay the transmission start time of the data frame, so that the transmission end time of the data frame coincides. If necessary, the data frame may be fragmented.

The access point 100 having received the data frames with the same transmission end time may simultaneously transmit the ACK frame to the fourth to sixth wireless stations 104 to 106 after an SIFS.

FIG. 17 illustrates a data transmitting/receiving method in a wireless LAN system using multiple channels in accordance with another embodiment of the present invention. A case where the first and second wireless stations 101 and 102 and the fourth and fifth wireless stations 104 and 105 transmit uplink data frames to the access point 100, without transmission opportunity according to RTS and CTS frames with respect to three multiple channels will be described below with reference to FIG. 17 as an embodiment of the present invention.

If the wireless station constituting a wireless LAN system (BSS) performs a backoff and first transmits the uplink data frame to the access frame, the wireless station does not enter the transmission opportunity setup duration using the RTS and CTS frames. Since the virtual channels of the first and second wireless stations 101 and 102 are in a busy state, the first and second wireless stations 101 and 102 are in a standby state until the virtual channels become an idle state. When the remaining available channels exist among the multiple channels, the fourth and fifth wireless stations 104 and 105 perform a backoff and transmit data frames. At this time, since the data frame of the fifth wireless station 105 is shorter than the data frame of the fourth wireless station 104, the fifth wireless station 105 may add null data to its data frame.

When the access point transmits the ACK frame and the first wireless station 101 firstly transmits the data frame through a random backoff after the D(A)IFS, the number of the remaining available channels is two. Thus, the fourth and fifth wireless stations 104 and 105 supporting the multiple channels may transmit the data frames. In this case, in order to coincide the ACK frame transmission start time of the access point, the fourth wireless station 104 fragments its data frame into $f_3$ and $f_4$, and the fifth wireless station 105 fragments its data frame into $f_1$ and $f_2$. Furthermore, the fourth wireless station 104 adds null data.

Thereafter, in the case of the data frame transmission according to a backoff, the first and second wireless stations 101 and 102 simultaneously transmit data frames. As described above, if the wireless LAN system uses a single channel, data collision occurs. However, in the wireless LAN system using multiple channels, the access point may receive the data frames of the first and second wireless station 101 and 102. One remaining available channel is left, and the fourth wireless station 104 may transmit the data frame through the remaining available channel.

Although the present invention has been described in terms of process, each step constituting the transmission opportunity setting methods and the data transmitting/receiving methods in the wireless LAN system using multiple channels in accordance with the present invention can also be understood easily in terms of device. That is, the respective steps of the transmission opportunity setting methods and the data transmitting/receiving methods in the wireless LAN system using multiple. channels in accordance with the present invention may be understood as components of an access point in a wireless LAN system using multiple channels in accordance with the principle of the present invention.

Specifically, the access point in accordance with the embodiment of the present invention includes: a reception unit configured to receive a request-to-send (RTS) frame from a wireless station, the RTS frame including information on a wireless LAN mode of the wireless station; and a transmission unit configured to transmit a clear-to-send (CTS) frame to the wireless station according to the number of remaining available channels among the multiple channels and/or the wireless LAN mode of the wireless station.

Alternatively, the wireless station in accordance with the embodiment of the present invention includes: a transmission unit configured to transmit an RTS frame to an access point, the RTS frame including information on a wireless LAN mode of a wireless station; and a reception unit configured to receive a CTS frame transmitted from the access point according to the number of remaining available channels among the multiple channels and/or the wireless LAN mode of the wireless station.

Alternatively, the access point in accordance with the embodiment of the present invention includes: a reception unit configured to receive an RTS frame from a first wireless station in a transmission opportunity setup duration, the RTS frame including information on a wireless LAN mode of the first wireless station; a control unit configured to select the wireless LAN mode, which is included in the RTS frame initially transmitted in the transmission opportunity setup duration, as a setup target of the transmission opportunity setup duration; and a transmission unit configured to transmit a CTS frame to the first wireless station.

Alternatively, the wireless station in accordance with the embodiment of the present invention includes: a reception unit configured to receive setup mode information from an access point, the setup mode information representing a wireless LAN mode which is a setup target in a transmission opportunity setup duration; a control unit configured to perform a random backoff according to the setup mode information; and a transmission unit configured to transmit an RTS frame to the access point according to the random backoff, the RTS frame including information on a wireless LAN mode of a wireless station.

Alternatively, the access point in accordance with the embodiment of the present invention includes: a first transmission unit configured to transmit a CTS frame to a wireless station in a transmission opportunity setup duration in response to an RTS frame transmitted from the wireless station; and a second transmission unit configured to transmit a CTS-to-self (SCTS) frame, which is beamformed for the wireless station, to the wireless station, where a NAV value included in the SCTS frame is determined according to time at which the wireless station receives the SCTS frame in the transmission opportunity setup duration.

Alternatively, the wireless station in accordance with the embodiment of the present invention includes: a transmission unit configured to transmit an RTS frame to an access point in a transmission opportunity setup duration; a first reception unit configured to receive a CTS frame from the access point; and a second reception unit configured to receive an SCTS frame, which is beamformed for a wireless station, from the access point, wherein a NAV value included in the SCTS frame is determined according to time at which the wireless station receives the SCTS frame in the transmission opportunity setup duration.

Alternatively, the access point in accordance with the embodiment of the present invention includes: a first reception unit configured to receive size information of uplink data with respect to a plurality of wireless stations, from the plurality of wireless stations having acquired transmission opportunity; a transmission unit configured to transmit the size information to the plurality of wireless stations; and a second reception unit configured to receive data frames from the plurality of wireless stations in a transmission duration of the wireless stations, the number or length of the data frame being adjusted according to the size information so that transmission start time and transmission end time of the data frames of the wireless stations coincide.

Alternatively, the wireless station in accordance with the embodiment of the present invention includes: a reception unit configured to receive information on uplink data size for a plurality of wireless stations, which have acquired transmission opportunity, from an access point or the plurality of wireless stations; a control unit configured to adjust the number or length of data frames of the wireless station according to the uplink data size so that transmission start time and transmission end time of the data frame of the wireless station coincide with those of the plurality of wireless stations; and a transmission unit configured to transmit the data frame, the number or length of which has been adjusted, to the access point.

In accordance with the exemplary embodiments of the present invention, the compatibility may be guaranteed without regard to the wireless LAN mode of the wireless station included in the wireless LAN system using multiple channels, and the transmission opportunity may be set to the wireless station.

Furthermore, the size or length of data frames is adjusted according to uplink data frames for a plurality of wireless stations connected through multiple channels, respectively, so as to guarantee compatibility which provides a wireless LAN service to the plurality of wireless stations.

Moreover, a very high throughput service may be simultaneously provided to the plurality of wireless stations included in the wireless LAN system using multiple channels.

The above-described methods can also be embodied as computer programs. Codes and code segments constituting the programs may be easily construed by computer programmers skilled in the art to which the invention pertains. Furthermore, the created programs may be stored in computer-readable recording media or data storage media and may be read out and executed by the computers. Examples of the computer-readable recording media include any computer-readable recoding media, e.g., intangible media such as carrier waves, as well as tangible media such as CD or DVD.

While the present invention has been described with respect to the specific embodiments, it will be apparent to those skilled in the art that various changes and modifications may be made without departing from the spirit and scope of the invention as defined in the following claims.

What is claimed is:

1. A transmission opportunity setting method in a wireless LAN system using multiple channels, comprising:
   receiving a request-to-send (RTS) frame from a wireless station, the RTS frame including information for whether a wireless LAN mode of the wireless station is a very high throughput (VHT) mode or a non-very high throughput (non-VHT) mode; and
   transmitting a clear-to-send (CTS) frame to the wireless station according to at least one of a number of remaining available channels among the multiple channels and the wireless LAN mode of the wireless station,
   wherein the wireless station acquires a transmission opportunity through a random backoff, and transmits the RTS frame.

2. The transmission opportunity setting method of claim 1, wherein in said transmitting the CTS frame to the wireless station,
   the CTS frame is transmitted to the wireless station when the wireless LAN mode of the wireless station is the non-VHT mode and the number of the remaining available channel is one.

3. The transmission opportunity setting method of claim 1, wherein in said transmitting the CTS frame to the wireless station,
   the CTS frame is transmitted to the wireless station when the wireless LAN mode of the wireless station is the VHT mode and the remaining available channel exits.

4. The transmission opportunity setting method of claim 1, wherein a network allocation vector (NAV) value included in the CTS frame is zero.

5. A transmission opportunity setting method in a wireless LAN system using multiple channels, comprising:
- transmitting a request-to-send (RTS) frame to an access point, the RTS frame including information for whether a wireless LAN mode of a wireless station is a very high throughput (VHT) mode or a non-very high throughput (non-VHT) mode; and
- receiving a clear-to-send (CTS) frame transmitted from the access point according to at least one of a number of remaining available channels among the multiple channels and the wireless LAN mode of the wireless station,
- wherein the wireless station acquires a transmission opportunity through a random backoff, and transmits the RTS frame.

6. The transmission opportunity setting method of claim 5, wherein in said receiving the CTS frame transmitted from the access point,
- the CTS frame transmitted from the access point is received when the wireless LAN mode of the wireless station is the non-VHT mode and the number of the remaining available channel is one.

7. A transmission opportunity setting method in a wireless LAN system using multiple channels, comprising:
- receiving a request-to-send (RTS) frame from a first wireless station in a transmission opportunity setup duration, the RTS frame including information for whether a wireless LAN mode of the first wireless station is a very high throughput (VHT) mode or a non-very high throughput (non-VHT) mode;
- selecting the wireless LAN mode, which is included in the RTS frame initially transmitted in the transmission opportunity setup duration, as a setup target of the transmission opportunity setup duration; and
- transmitting a clear-to-send (CTS) frame to the first wireless station,
- wherein the wireless LAN mode which is the setup target of the transmission opportunity setup duration is determined according to the wireless LAN mode of the first wireless station which initially transmits the RTS frame in the transmission opportunity setup duration,
- wherein a network allocation vector (NAV) value is set in the CTS frame, and includes selection information.

8. The transmission opportunity setting method of claim 7, further comprising:
- receiving a RTS frame from a second wireless station, the RTS frame including information on a wireless LAN mode of the second wireless station;
- determining whether the wireless LAN mode of the second wireless station coincides with the setup target; and
- transmitting a CTS frame to the second wireless station according to the determination result.

9. A transmission opportunity setting method in a wireless LAN system using multiple channels, comprising:
- receiving setup mode information from an access point, the setup mode information representing a wireless LAN mode which is a setup target in a transmission opportunity setup duration;
- performing a random backoff according to the setup mode information; and
- transmitting a request-to-send (RTS) frame to the access point according to the random backoff, the RTS frame including information on a wireless LAN mode of a wireless station.

10. The transmission opportunity setting method of claim 9, wherein the setup mode information includes a network allocation vector (NAV) value included in a clear-to-send (CTS) frame.

11. The transmission opportunity setting method of claim 10, wherein in said performing a random backoff according to the setup mode information,
- a virtual channel is set to a busy state according to the NAV value when the wireless station is a non-very high throughput (non-VHT) mode.

12. A transmission opportunity setting method in a wireless LAN system using multiple channels, comprising:
- transmitting a clear-to-send (CTS) frame to a wireless station in a transmission opportunity setup duration in response to a request-to-send (RTS) frame transmitted from the wireless station; and
- transmitting a CTS-to-self (SCTS) frame, which is beamformed for the wireless station, to the wireless station,
- wherein a network allocation vector (NAV) value included in the SCTS frame is determined according to time at which the wireless station receives the SCTS frame in the transmission opportunity setup duration,
- wherein the SCTS frame is transmitted after elapse of a Retransmission IFS (RIFS) from the transmission of the CTS frame.

13. A transmission opportunity setting method in a wireless LAN system using multiple channels, comprising:
- transmitting a request-to-send (RTS) frame to an access point in a transmission opportunity setup duration;
- receiving a clear-to-send (CTS) frame froM the access point; and
- receiving a CTS-to-self (SCTS) frame, which is beamformed for a wireless station, from the access point,
- wherein a network allocation vector (NAV) value included in the SCTS frame is determined according to time at which the wireless station receives the SCTS frame in the transmission opportunity setup duration,
- wherein the SCTS frame is transmitted after elapse of a Retransmission IFS (RIFS) from the transmission of the CTS frame.

14. The transmission opportunity setting method of claim 13, further comprising setting a virtual channel to a busy state according to the NAV value.

* * * * *